United States Patent
Hosek et al.

(10) Patent No.: US 10,742,070 B2
(45) Date of Patent: Aug. 11, 2020

(54) MOVABLE POWER COUPLING AND A ROBOT WITH MOVABLE POWER COUPLING

(71) Applicant: Persimmon Technologies, Corp., Wakefield, MA (US)

(72) Inventors: Martin Hosek, Lowell, MA (US); Sripati Sah, Wakefield, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 800 days.

(21) Appl. No.: 15/017,941

(22) Filed: Feb. 8, 2016

(65) Prior Publication Data

US 2016/0229296 A1 Aug. 11, 2016

Related U.S. Application Data

(60) Provisional application No. 62/112,768, filed on Feb. 6, 2015.

(51) Int. Cl.
*H02J 50/12* (2016.01)
*B60M 7/00* (2006.01)
(Continued)

(52) U.S. Cl.
CPC .............. *H02J 50/12* (2016.02); *B60L 5/005* (2013.01); *B60L 9/00* (2013.01); *B60L 9/08* (2013.01); *B60L 53/12* (2019.02); *B60M 7/003* (2013.01); *H01F 38/14* (2013.01); *H02J 50/10* (2016.02); *B60L 2200/26* (2013.01); *Y02T 90/122* (2013.01)

(58) Field of Classification Search
CPC ......... B60L 5/005; B60L 53/12; B60M 7/003; H02J 5/005; H02J 7/025; H02J 50/10; H02J 50/12; Y02T 90/122; H01F 38/14
USPC ............................................ 191/10; 307/104
See application file for complete search history.

(56) References Cited

U.S. PATENT DOCUMENTS

| | | |
|---|---|---|
| 4,049,092 A | 9/1977 | Lillard et al. |
| 4,145,018 A | 3/1979 | Poggio et al. |

(Continued)

FOREIGN PATENT DOCUMENTS

| | | | |
|---|---|---|---|
| JP | 56140610 A | 11/1981 | |
| JP | S63151006 A | 6/1988 | |

(Continued)

*Primary Examiner* — Zachary L Kuhfuss
(74) *Attorney, Agent, or Firm* — Harrington & Smith

(57) ABSTRACT

An apparatus comprises a first induction section comprising a first core and a first coil on the first core. A second induction section comprises a second core and a second coil on the second core. The first core comprises rail extensions, where at least two of the rail extensions extend from opposite ends of the first core. The second core comprises shoe portions located at respective ones of the rail extensions, where a gap is provided between each of the rail extensions and respective ones of the shoe portion. The second induction section is configured to move relative to the first induction section in a path along the extensions. The first induction section is configured to induce current in the second induction section, including when the second core moves relative to the first core along the extensions, to provide a contactless induction coupling between the first induction section and the second induction section.

22 Claims, 11 Drawing Sheets

(51) Int. Cl.
   *B60L 9/00* (2019.01)
   *H02J 50/10* (2016.01)
   *B60L 53/12* (2019.01)
   *H01F 38/14* (2006.01)
   *B60L 5/00* (2006.01)
   *B60L 9/08* (2006.01)

(56) References Cited

U.S. PATENT DOCUMENTS

| | | | |
|---|---|---|---|
| 4,612,527 A | 9/1986 | Third et al. | |
| 5,737,211 A * | 4/1998 | Hirai | H01F 38/14 363/144 |
| 6,129,025 A | 10/2000 | Minakami et al. | |
| 6,848,547 B1 * | 2/2005 | Odachi | B60L 5/005 104/130.06 |
| 6,931,304 B1 | 8/2005 | Miller et al. | |
| 7,825,544 B2 * | 11/2010 | Jansen | A61C 1/0015 307/104 |
| 9,601,265 B2 * | 3/2017 | Sugino | H01F 38/14 |
| 9,862,277 B2 | 1/2018 | Dames et al. | |
| 2007/0013328 A1 | 1/2007 | Shemm | |
| 2012/0256494 A1 * | 10/2012 | Kesler | H03H 7/40 307/104 |
| 2013/0071218 A1 * | 3/2013 | Hosek | H01L 21/67259 414/744.5 |
| 2014/0084699 A1 | 3/2014 | Sugino et al. | |
| 2014/0205416 A1 | 7/2014 | Hosek et al. | 414/744.6 |
| 2014/0285138 A1 * | 9/2014 | Duschl-Graw | B60L 5/005 320/108 |
| 2015/0214086 A1 | 7/2015 | Hofmeister et al. | 32/472 |

FOREIGN PATENT DOCUMENTS

| | | |
|---|---|---|
| JP | H-0837121 A | 2/1996 |
| JP | 2000092729 A | 3/2000 |
| JP | 2000333303 A | 11/2000 |
| JP | 2009517999 A | 4/2009 |
| JP | 2013070477 A | 4/2013 |
| JP | 2014017973 A | 1/2014 |
| JP | 2014170905 A | 9/2014 |

* cited by examiner

MOVABLE POWER COUPLING AND A ROBOT WITH MOVABLE POWER COUPLING

CROSS REFERENCE TO RELATED APPLICATION

This application claims priority under 35 119(e) to U.S. Provisional patent application No. 62/112,768 filed Feb. 6, 2015 which is hereby incorporated by reference in its entirety.

BACKGROUND

Technical Field

The exemplary and non-limiting embodiments relate generally to power couplings and, more particularly, to moveable electric power couplings.

Brief Description of Prior Developments

Industrial equipment often has moving automation or payloads that require electrical power to operate. Typically a service loop will be provided that provides power from a stationary component to the moving component where the service loop may have multiple conductors in an e-chain or otherwise. The flexing of the wires may become a reliability concern and the relative movement of the wires and/or e-chain may generate unwanted particles or contamination.

SUMMARY

The following summary is merely intended to be exemplary. The summary is not intended to limit the scope of the claims.

In accordance with one aspect, an apparatus comprises a first induction section comprising a first core and a first coil on the first core. A second induction section comprises a second core and a second coil on the second core. The first core comprises rail extensions, where at least two of the rail extensions extend from opposite ends of the first core. The second core comprises shoe portions located at respective ones of the rail extensions, where a gap is provided between each of the rail extensions and respective ones of the shoe portion. The second induction section is configured to move relative to the first induction section in a path along the extensions. The first induction section is configured to induce current in the second induction section, including when the second core moves relative to the first core along the extensions, to provide a contactless induction coupling between the first induction section and the second induction section.

In accordance with another exemplary aspect, a method may comprise providing a first induction section comprising a first core and a first coil on the first core, where the first core comprises rail extensions, where at least two of the rail extensions extend from opposite ends of the first core. The method may further comprise providing a second induction section comprising a second core and a second coil on the second core, where the second core comprises shoe portions. The method may further comprise locating the second induction section relative to the first induction section, where the shoe portions are located at respective ones of the rail extensions, where a gap is provided between each of the rail extensions and respective ones of the shoe portions, and such that the second induction section is configured to move relative to the first induction section in a path along the extensions. The first induction section is configured to induce current in the second induction section, including when the second core moves relative to the first core along the extensions, to provide a contactless induction coupling between the first induction section and the second induction section.

In accordance with another exemplary aspect, a method may comprise providing a contactless induction coupling comprising a first induction section and a second induction section, where the first induction section comprises a first core and a first coil on the first core, where the first core comprises rail extensions, where at least two of the rail extensions extend from opposite ends of the first core, and where the second induction section comprises a second core and a second coil on the second core, where the second core comprises shoe portions, the second induction section being located relative to the first induction section such that the shoe portions are located at respective ones of the rail extensions with a gap provided between each of the rail extensions and respective ones of the shoe portions, and such that the second induction section is configured to move relative to the first induction section in a path along the extension. While the second induction section moves along the extensions of the first induction section, producing alternating magnetic flux at the first induction section and inducing current in the second induction section from the alternating magnetic flux.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
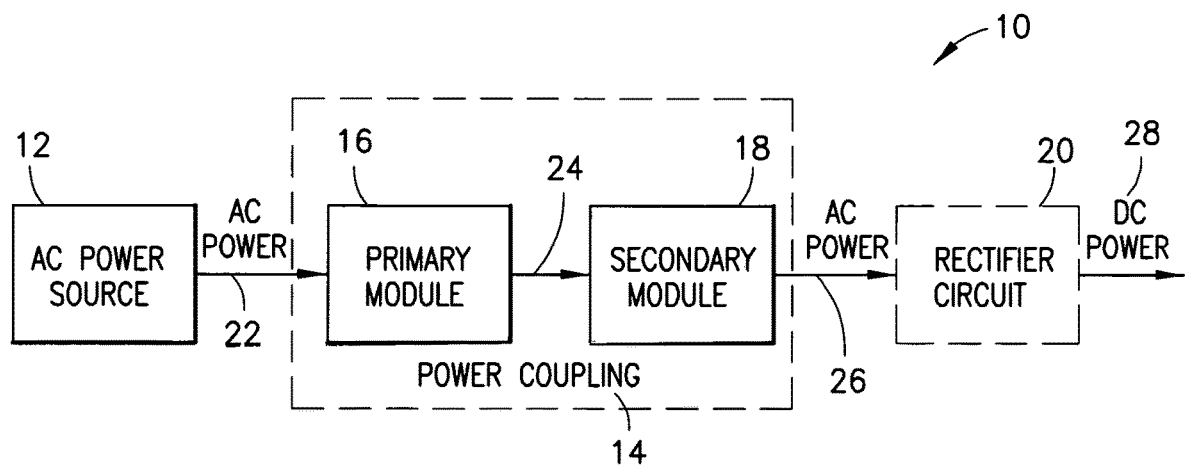
FIG. 1 is a block diagram representation of one exemplary embodiment coupling.

Referring to FIG. 1, there is shown block diagram representation of one exemplary embodiment coupling 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Device or coupling 10 is provided for contactless electric power transmission between two movable objects, for example, a stationary traverser and a robot utilizing the device. Device or coupling 10 may be used in combination with transport mechanisms and devices as disclosed in United States Publication No. 2013/0071218 published Mar. 21, 2103 based on U.S. patent application Ser. No. 13/618, 117 filed Sep. 14, 2012 and entitled "Low Variability Robot" or U.S. patent application Ser. No. 14/601,455 filed Jan. 21, 2015 and entitled "Substrate Transport Platform" both of which are hereby incorporated by reference herein in their entirety. Device or coupling 10 may be used in combination with transport mechanisms and devices as disclosed in "Robot Having Arm with Unequal Link Lengths", U.S. Patent Publication No. 2014/0205416 A1, Jul. 24, 2014 which is hereby incorporated by reference herein in its entirety. Alternately, the coupling 10 may be used in any suitable device or applications.

Referring to FIG. 1, there is shown a block diagram representation of one exemplary embodiment coupling 10. As depicted, the device or coupling 10 may include an AC power source 12, a power coupling 14 with a primary module 16 and a secondary module 18, and an optional rectifier circuit 20. AC power 22 is supplied to the primary 16 where the primary 16 in turn provides power to the secondary 18 over gap 24 where the secondary 18 provides AC power 26 to the rectifier circuit 20. The primary and secondary modules are configured so that they can move with respect to each other, including translation, rotation or a combination of the two. The primary and secondary may be primary or secondary cores or primary or secondary rails. In alternate aspects, any suitable combination or geometry may be provided.

Figure 2:
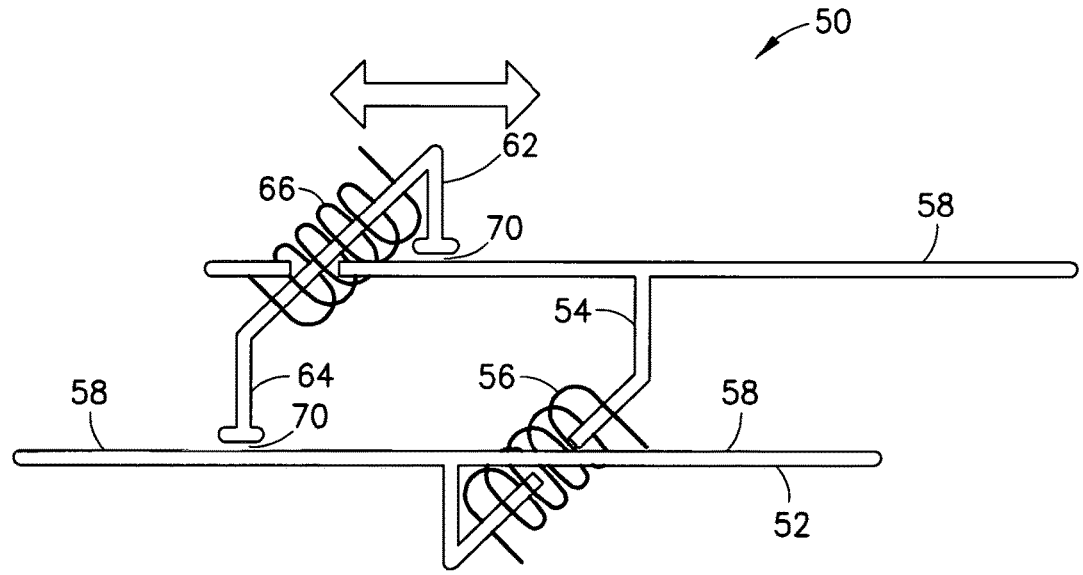
FIG. 2 is a isometric representation of one exemplary embodiment coupling.
Figure 3:
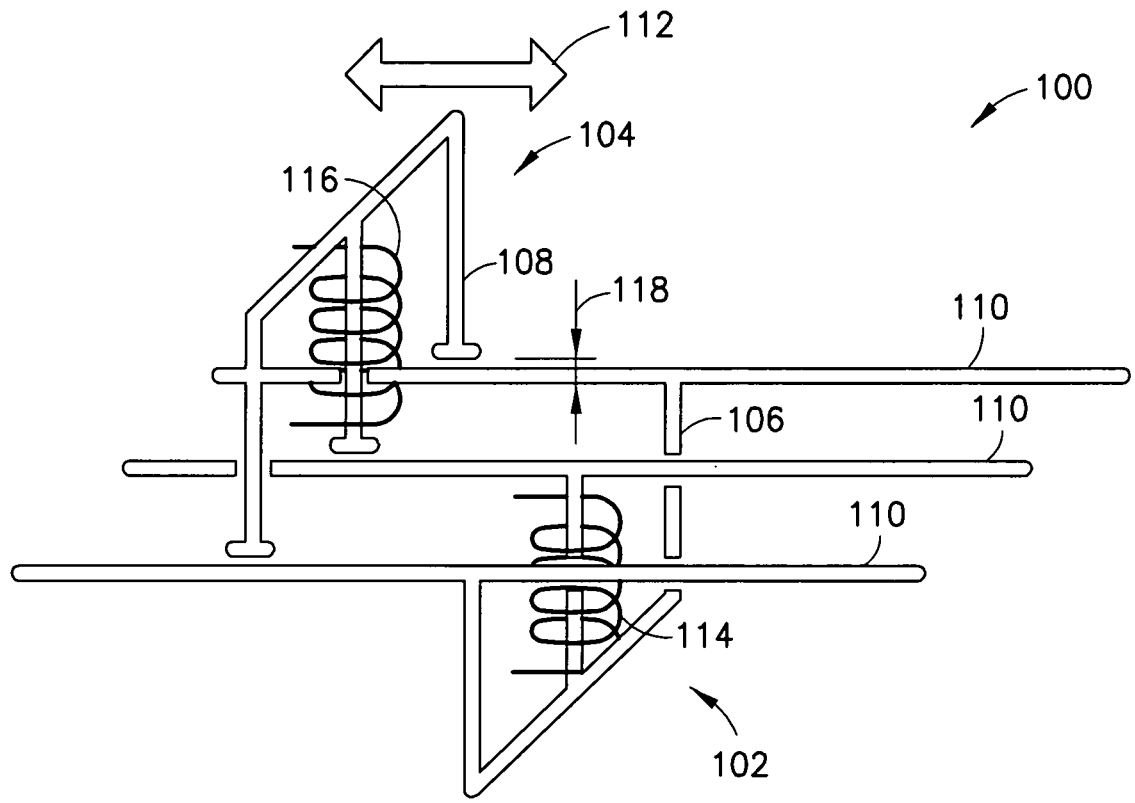
FIG. 3 is a isometric representation of one exemplary embodiment coupling.

Referring now to FIG. 2, an isometric representation of one exemplary embodiment coupling 50 is shown. The primary module 52 may consist of a primary core or rail 54 and a primary winding or coil 56, which may be configured so that AC current, e.g., supplied by the AC power source 12, through the primary winding 56 produces alternating magnetic flux in the primary core or rail 54. The primary core or rail 54 may feature extensions 58 along the direction of relative motion between the primary module 52 and secondary module 62. The secondary module 62 may consist of a secondary core or rail 64 and a secondary winding or coil 66 configured so that alternating magnetic flux in the secondary core or rail 64 induces voltage in the secondary winding 66. The secondary core or rail 64 may be arranged so that it may move as part of the secondary module along the extensions 58 of the primary core or rail 54 and so that magnetic flux may pass between the extensions of the primary core or rail and the secondary core or rail at shoe portions across an air gap 70 between the extensions 58 of the primary core or rail 52 and the secondary core or rail 62. The output of the secondary winding 66 may be used as an AC power source directly, or, if DC power is required, the secondary winding 66 may feed the rectifier circuit 20, which in turn may serve as a DC power source 28, as illustrated in FIG. 1. The primary winding 56 and secondary winding 66 may feature substantially the same number of turns in order for the amplitude of the output voltage of the secondary winding to be substantially equal to the amplitude of the voltage supplied by the AC power source 12. The number of turns of the secondary winding 66 may be higher than the number of turns of the primary winding 56 if higher output voltage is required. Conversely, the number of turns of the secondary winding 66 may be lower than that of the primary winding 56 if lower output voltage is required. The primary core 54 and secondary core 64 may be C-shaped, as depicted diagrammatically in FIG. 2, E-shaped, as illustrated in FIG. 3, or they can feature any suitable shape that allows for inductive coupling between the primary module 52 and the secondary module 62. The extensions 58 of the primary core 54 may be straight to support straight-line motion between the primary module 52 and secondary module 62, as in the examples of FIGS. 2 and 3, or they may be curved to support curved or rotary motion. Example configurations of the arrangement for rotary motion are shown by way of example in FIGS. 4 and 5. The extensions 58 of the primary core 54 and the portions of the secondary core 64 that form the air gap 70 may be shaped to minimize the reluctance across the air gap 70, as depicted in the examples of FIG. 6. The primary core 54, extensions 58 and secondary core 64 may be produced from a soft magnetic material, for instance, silicon steel, soft magnetic composite, another material suitable to channel magnetic flux or a combination of such materials. Laminated construction may be utilized. Here, the primary and secondary may be considered as induction sections with the windings being coils.

Figure 5:
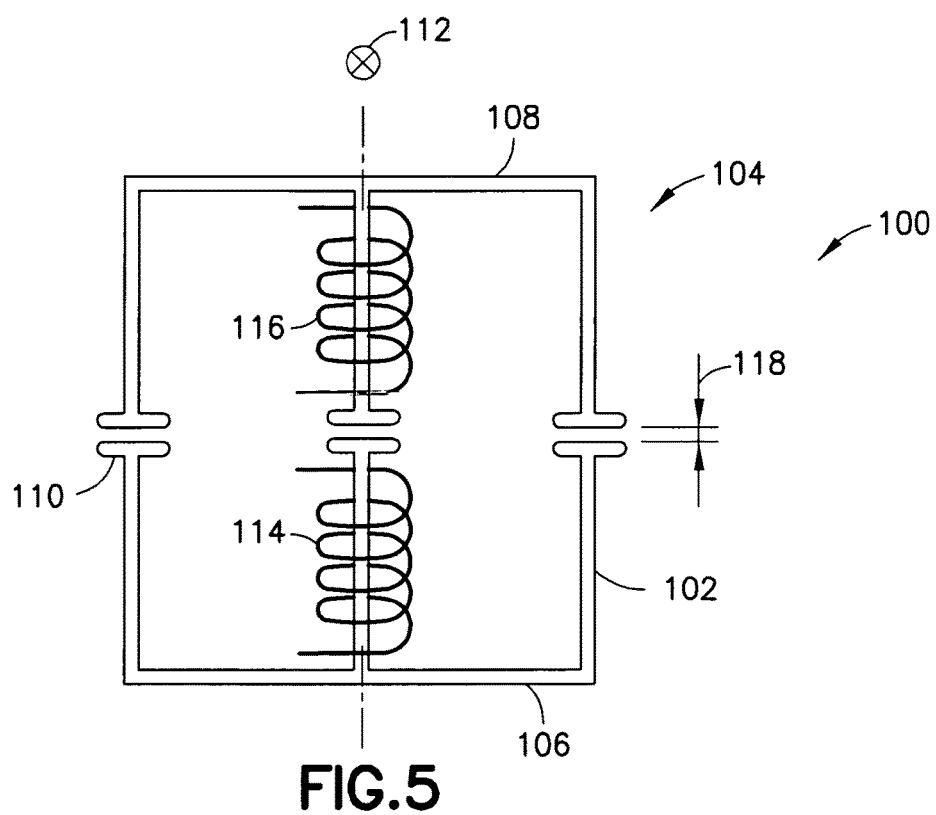
FIG. 5 is an end representation of one exemplary embodiment coupling.
Figures 6A, 6B, 6C, 6D:
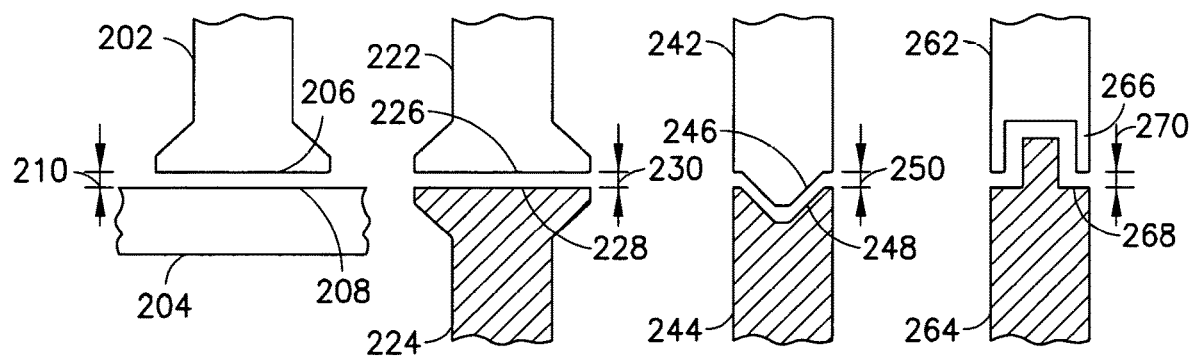
FIG. 6A is a representation of one exemplary core set of a coupling.
FIG. 6B is a representation of one exemplary core set of a coupling.
FIG. 6C is a representation of one exemplary core set of a coupling.
FIG. 6D is a representation of one exemplary core set of a coupling.

Referring now to FIG. 3, there is shown an isometric, representation of one exemplary embodiment coupling 100. Referring also to FIG. 5, there is shown an end representation of one exemplary embodiment coupling 100. Coupling 100 is shown having E-shaped primary 102, E-shaped secondary 104, E-shaped primary core 106 and E-shaped, secondary core 108. Extensions 110 extend from the three portions of E-shaped primary core 106. Primary winding 114 resides on the center leg of E-shaped primary core 106 and secondary winding 116 resides on the center leg of E-shaped secondary core 108 where flux is directed through the center legs and around 2 loops, each corresponding to the outer legs. Secondary 104 moves along motion axis 112 relative to primary 102 where alternating flux passes across gap 118 transferring power from primary winding 114 to secondary winding 116.

Figure 4:
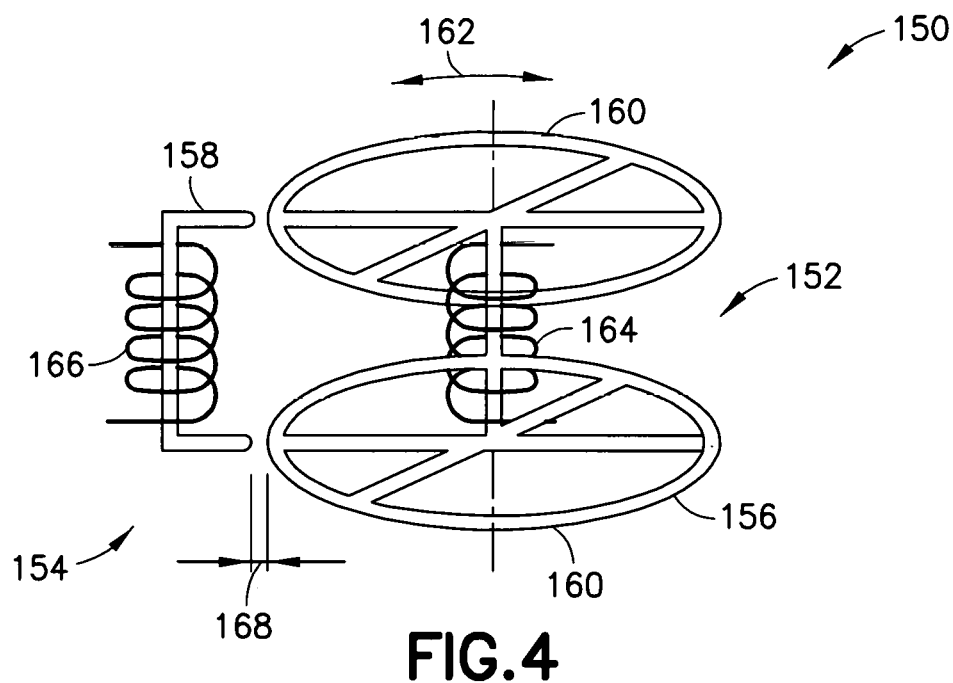
FIG. 4 is a isometric representation of one exemplary embodiment coupling.

Referring now to FIG. 4, there is shown an isometric representation of one exemplary embodiment coupling 150 where coupling 150 comprises a rotary power coupling. Coupling 150 has a round shaped primary 152 and a secondary 154 that rotates 162 about an axis centered on round primary 152. Primary core 156 and secondary core 158 pass alternating flux between them over gap 168 where diameter extensions 160 provided round surfaces that interface with C-shaped core 158 as core 158 rotates about motion axis 162 and maintaining gap 168. Here, primary winding 164 generates alternating flux in secondary winding 166 through cores 156 and 158 and over non-contact gap 168.

Referring now to FIGS. 6A-6D, there are shown representations of exemplary core sets of a coupling showing alternative geometries, for example, shoe portions that pass magnetic flux over a non-contact gap. FIGS. 6A-6D show exemplary non-limiting geometries and in alternate aspects, any suitable geometry may be used to pass magnetic flux over a gap that is maintained for linear, rotary or any suitable relative motion. By way of example in FIG. 6A cores 202, 204 may have a widened flat surface 206 and flat surface 208 across gap 210. By way of further example, in FIG. 6B cores 222, 224 may have widened surface 226 and corresponding widened surface 228 across gap 230. By way of further example, in FIG. 6C cores 242, 244 may have v shaped surface 246 and corresponding surface 248 across gap 250. By way of further example, in FIG. 6D cores 262, 264 may have key shaped surface 266 and corresponding surface 268 across gap 270. In alternate aspects, any suitable geometry may be used to pass magnetic flux over a gap that is maintained for linear, rotary or any suitable relative motion.

Figure 7:
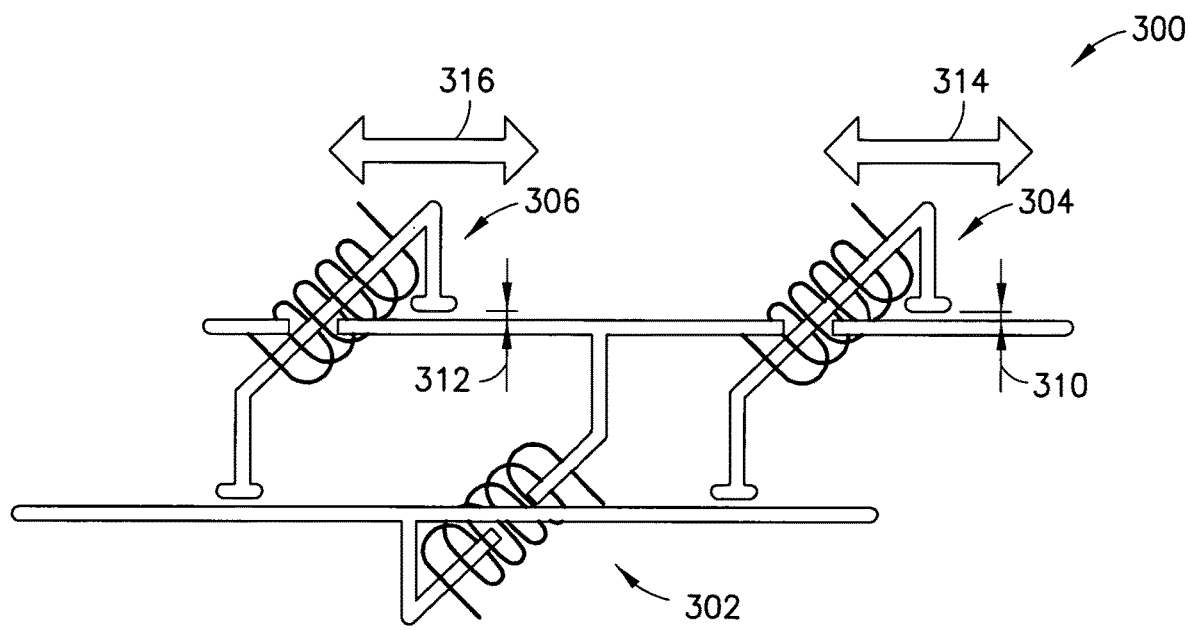
FIG. 7 is a isometric representation of one exemplary embodiment coupling.
Figure 8:
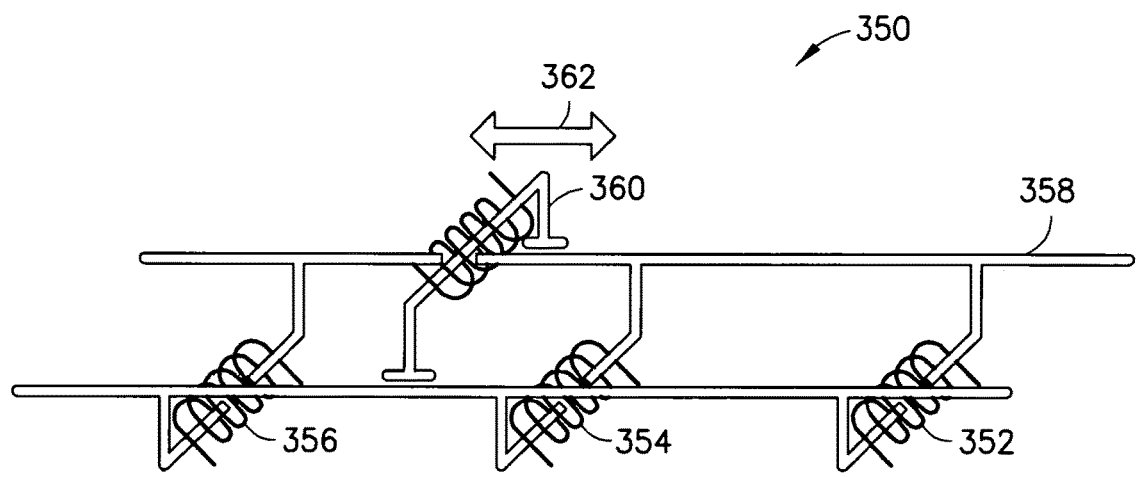
FIG. 8 is a isometric representation of one exemplary embodiment coupling.
Figure 9:
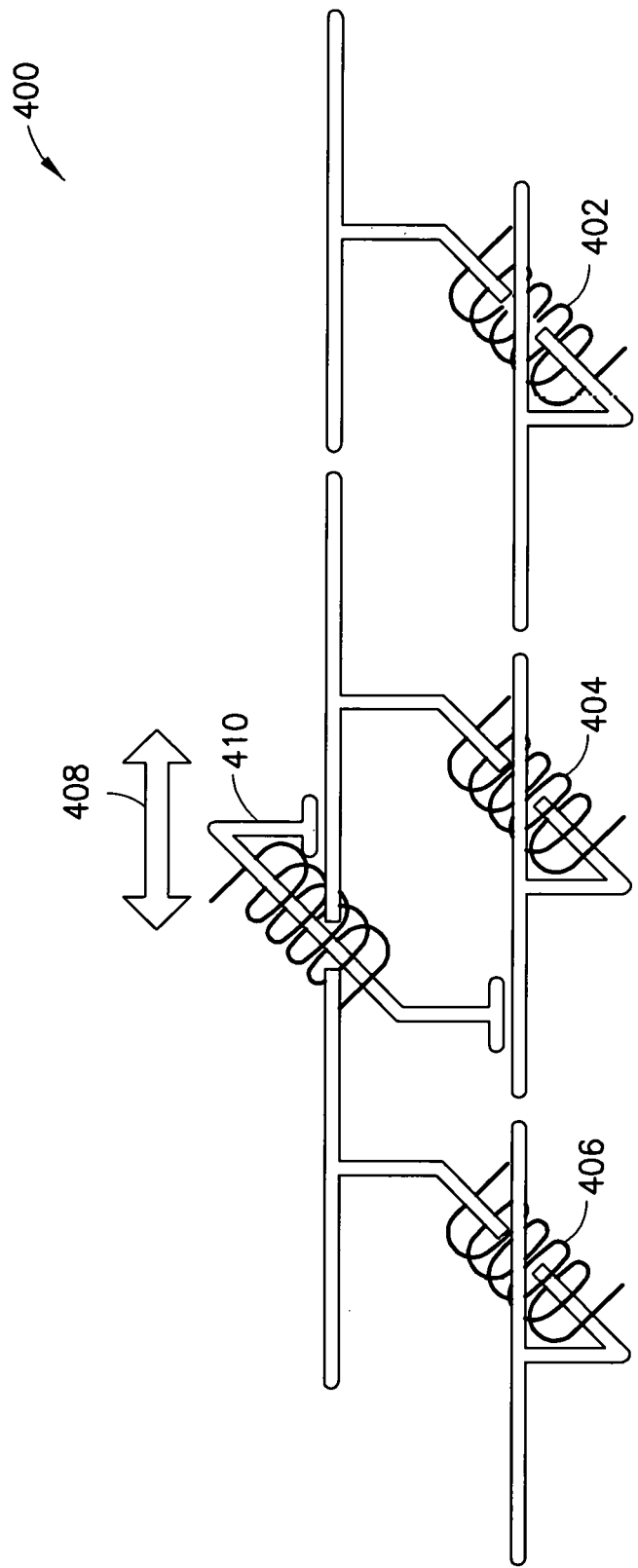
FIG. 9 is a isometric representation of one exemplary embodiment coupling.

Referring now to FIG. 7, there is shown an isometric representation of one exemplary embodiment coupling 300. Coupling 300 may have a single primary 302 and multiple secondary modules 304, 306 that may interact with single primary module 302, over gaps 310, 312. Here, first and second secondary 304, 306 may move independently on independent movement axis 314, 316 as illustrated in FIG. 7. Referring also to FIG. 8, there is shown an isometric representation of one exemplary embodiment coupling 350. Here, coupling 350 may use multiple primary windings 352, 354, 356 that may be utilized in a single primary module 358, as shown in FIG. 8 with secondary 360 having relative movement with secondary motion axis 362. Referring also to FIG. 9, there is shown an isometric representation of one exemplary embodiment coupling 400. Here, coupling 400 may have multiple primary modules 402, 404, 406 that may be employed to extend the range of motion 408 of secondary 410, as depicted in FIG. 9. When multiple primary coils and/or primary modules are used, they may be powered from the AC source continuously or switched on/off based on the position of the secondary module.

Figure 10:
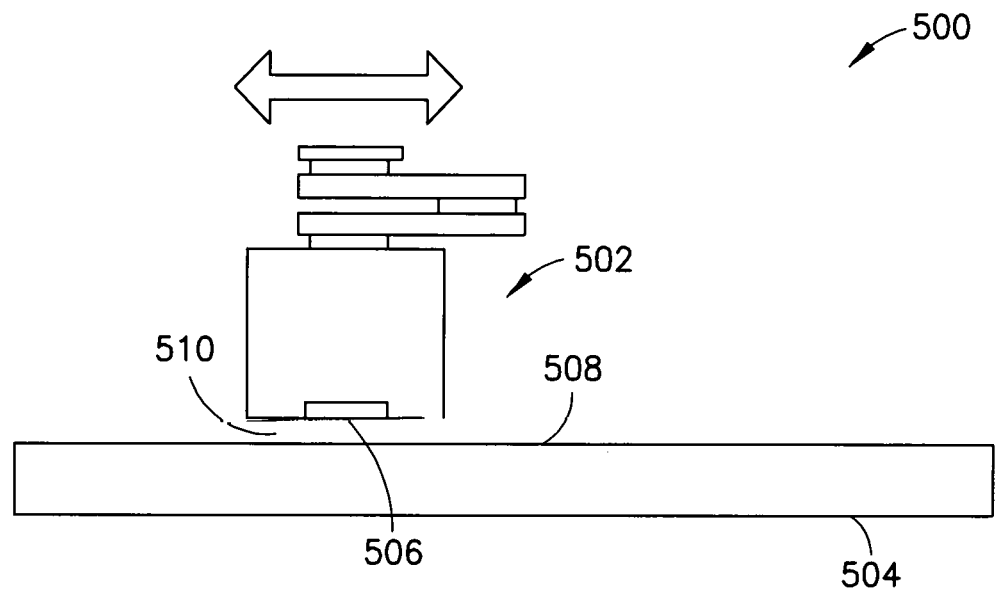
FIG. 10 is a representation of an exemplary robot incorporating an embodiment coupling.
Figure 11:
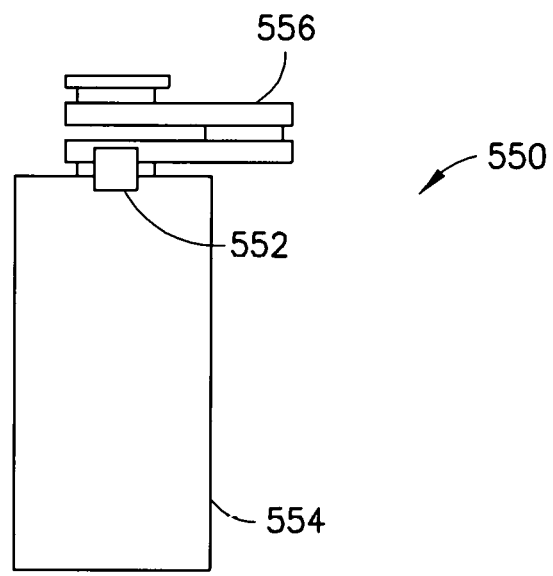
FIG. 11 is a representation of an exemplary robot incorporating an embodiment coupling.

A separation barrier may be utilized between the primary module and the secondary module, for example, if the two modules are located in different environments. For instance, if the primary module is in an atmospheric environment and the secondary module resides in a vacuum environment, the separation barrier may separate the atmospheric environment from the vacuum environment. The separation barrier may be conductive or non-conductive and made of a suitable material to allow the alternating flux to pass between the primary and secondary as described in any of the disclosed embodiment. The coupling described may also be utilized to transmit signals and/or data, or any combination of power, signals and data in any suitable application having relative movement. By way of example, referring also to FIG. 10, there is shown a representation of an exemplary robot 500 incorporating an embodiment coupling 506. Here, FIG. 10 depicts diagrammatically a robot 500 having a robot drive with articulate arm 502 on a shuttle 504 with the power coupling 506 employed to transmit power from the stationary portion 508 of the shuttle to the moving portion 510 of the shuttle and the robot where a gap may be formed between the stationary portion 508 of the shuttle and the moving portion 510 of the shuttle to pass alternating flux as described over air or other medium or a physical separation barrier with any suitable gas, liquid, vacuum or otherwise. By way of further example, referring also to FIG. 11, there is shown a representation of an exemplary robot 550 incorporating an embodiment coupling 552. Here, FIG. 11 shows diagrammatically a robot 550 where the power coupling 552, this time in a rotary configuration, may be utilized to transmit power from the stationary portion 554 of the robot to the moving arm 556 of the robot. Here, a gap may be formed between the stationary portion 554 of the robot and the rotary portion 556 of the robot to pass alternating flux as described over air or other medium or through a physical separation barrier with any suitable gas, liquid, vacuum or otherwise. In alternate aspects, any suitable application with relative motion may be provided.

As described, a power coupling transfers electrical power from a stationary body to another stationary body/bodies, or a moving body/bodies, or intermittently moving body/bodies. Here, the power transfer may be by strong or weak electromagnetic coupling between windings on the stationary and moving bodies. Here, the stationary body/bodies, or moving body/bodies, or intermittently moving body/bodies may be any suitable combination of primary(s) and/or secondary(s).

Figure 12:
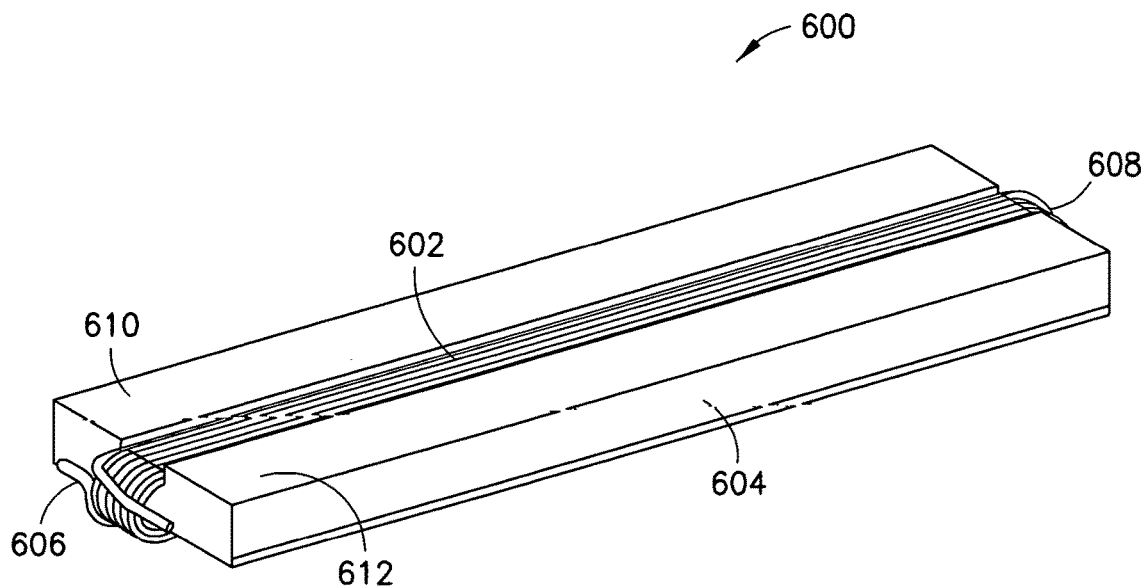
FIG. 12 is a isometric representation of one exemplary embodiment primary.
Figure 13:
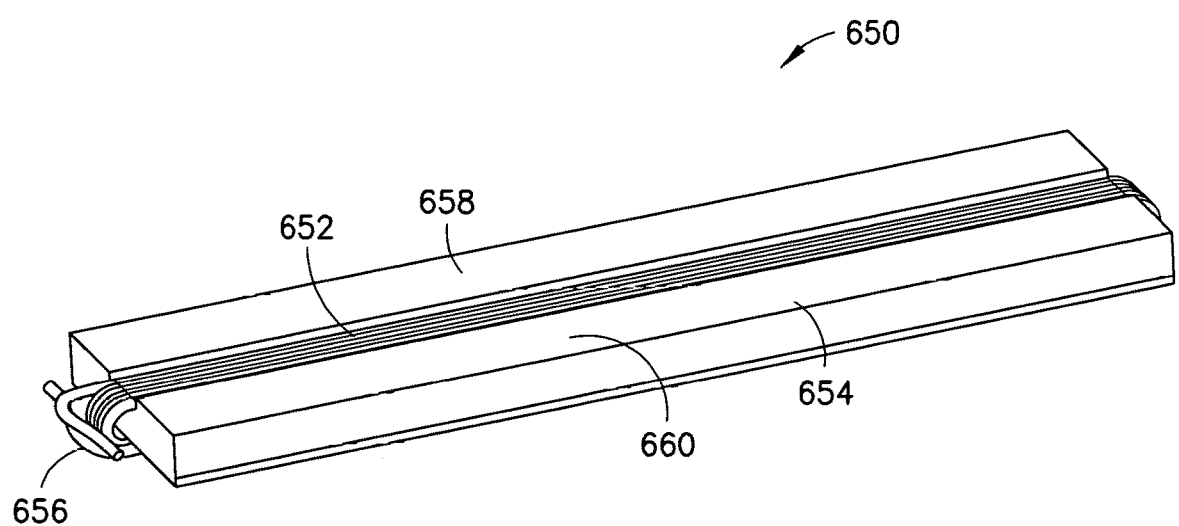
FIG. 13 is a isometric representation of one exemplary embodiment secondary.
Figure 14:
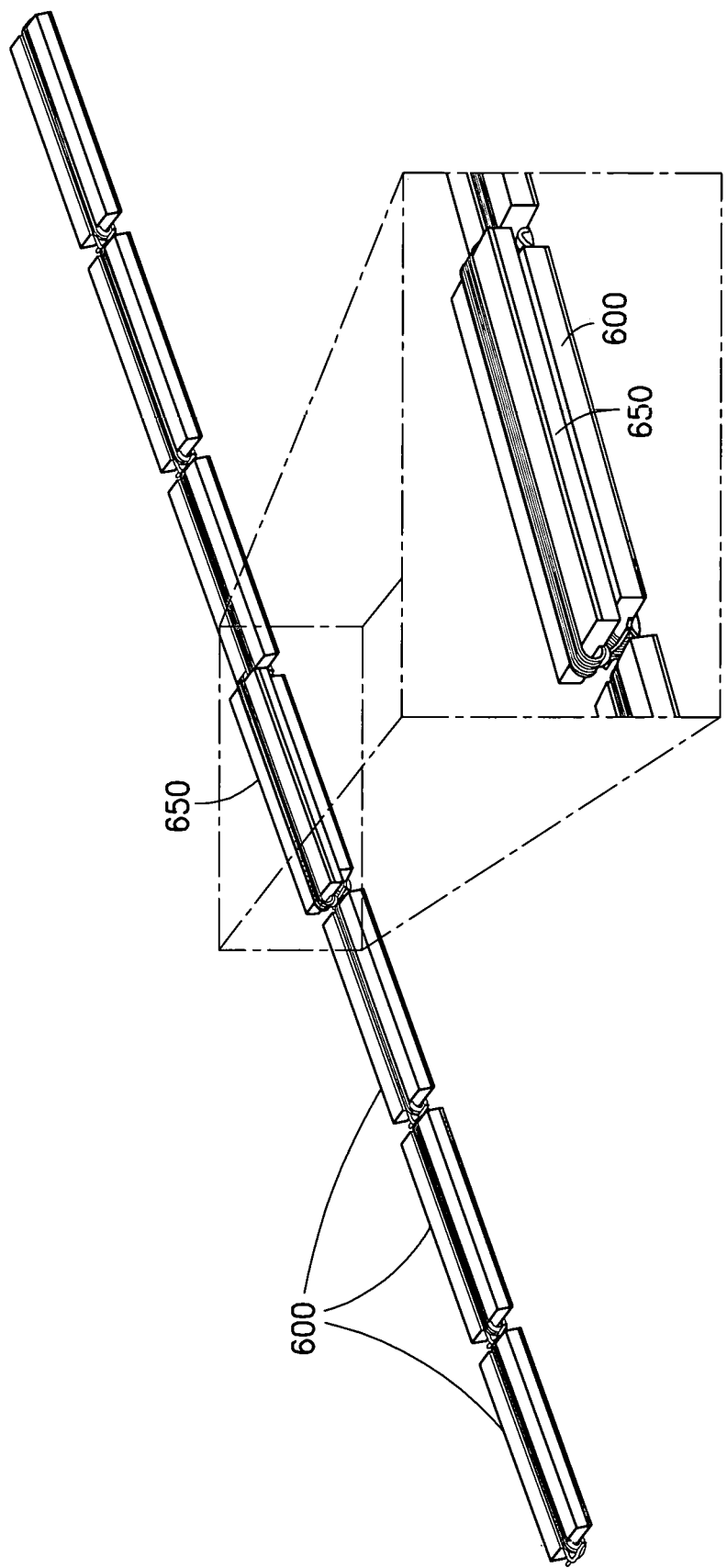
FIG. 14 is a representation of one exemplary embodiment coupling.
Figure 15:
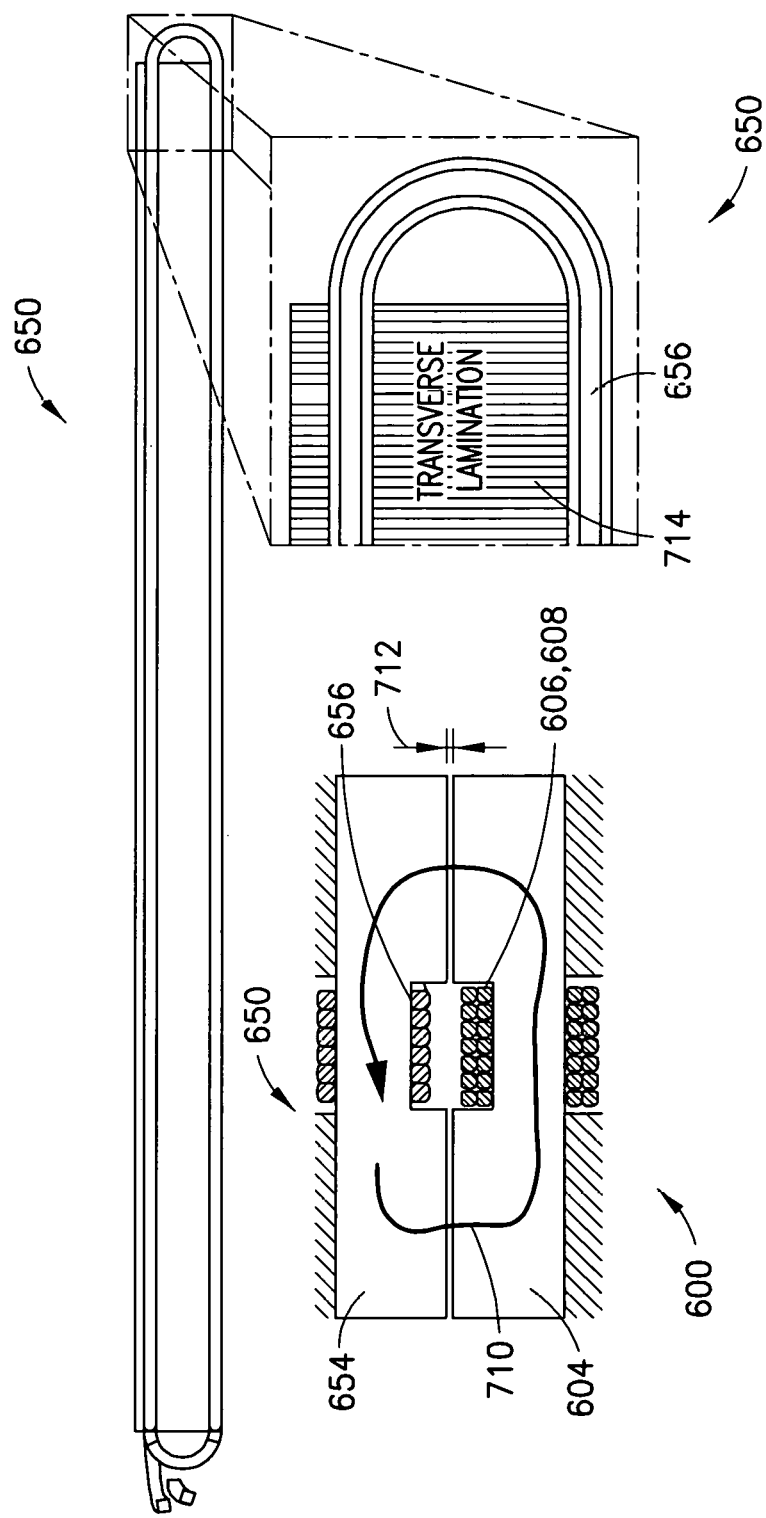
FIG. 15 is a representation of one exemplary embodiment coupling.

Referring now to FIG. 12, there is shown an isometric representation of one exemplary embodiment primary 600. Here, the stationary body or primary 600 has an arrangement of flux concentrators or primary core 604 having faces 610, 612, such as, but not limited to, a soft iron core, soft magnetic composites, or laminated cores, with a single or multi-turn winding 602 of a good electrical conductor such as copper. These windings 602 are excited by means of a varying voltage or current source, in scenarios where the excitation is sinusoidal, a near sinusoidal magnetic flux may be generated. Individual flux generators are referred to as a primary 600. An array of primaries can be used generate a varying magnetic flux in the path of the moving body. The windings 602 of the primary may be connected electrically, for example via interconnects or terminations 606, 608, in parallel, in series, or be individually connected to excitation devices, with advantages and disadvantages, to each configuration. In alternate aspects, the windings can extend the full length of the primary core 604. Referring also to FIG. 13, there is shown an isometric representation of one exemplary embodiment secondary 650. The moving body/bodies also have an arrangement of flux concentrators or secondary core 654 having faces 660, 658, for example, that interface with faces 610, 612 over a gap, such as, but not limited to, a soft iron core, soft magnetic composites, or laminated cores, with a single or multi-turn winding 652 of a good electrical conductor such as copper with terminations 656. This arrangement on the moving body, referred to as the secondary 650, serves to capture some of the magnetic flux generated from the primary(s) 600. There can be single or multiple number of secondary's in a single power transfer mechanism. In accordance with the laws of electromagnetic induction this generates a time varying voltage on the secondary winding. Electrical power can be drawn off from the secondary. By way of example, the windings may extend the full length of the secondary core. Referring also to FIG. 14, there is shown a representation of one exemplary embodiment coupling having multiple primaries 600 and secondary 650. Here, primaries 600 may be wired in series where secondary 650 draws power from alternating flux induced in the core. Referring also to FIG. 15, there is shown representation of one exemplary embodiment coupling having primary 600 and secondary 650. Here, primary 600 has primary core 604 and winding 602 with terminations 606, 608 where winding 602 has an alternating current that induces magnetic flux in core 604. Flux path 710 is established over gap 712 and through primary core 604 and secondary core 654 where secondary 650 draws power via secondary winding 656 from alternating flux 710 induced in the core 654. Here, secondary core 656 may have transverse laminates 714 to reduce losses. Alternately, any suit able core may be used. The voltage on the secondary coil is time varying, for example, close to sinusoidal in nature. A FET based full wave rectifier circuit or any suitable circuit may be used to transform it to a DC voltage if a DC voltage is needed. Given the need to link the magnetic flux generated in the primary core 604 with the secondary 654, and the competing need to minimize Iron losses in the core material, it is suitable to manufacture the cores using transverse laminations 714 as shown in FIG. 15. The laminations allow the flux to travel between the primary and secondary through the air gap while minimizing the eddy current loops that would form in the plane perpendicular to the flux flow.

Figure 16:
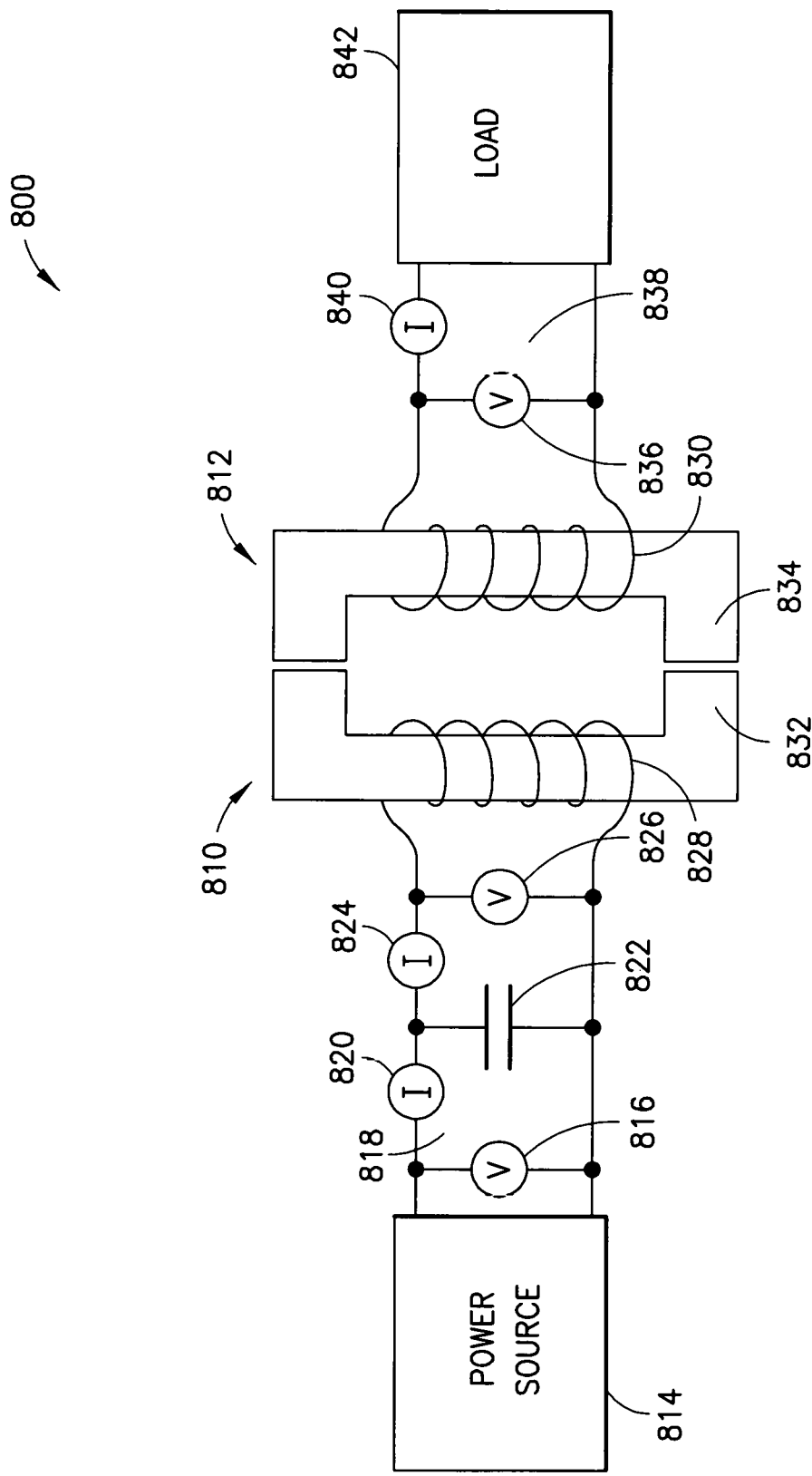
FIG. 16 is a schematic representation of one exemplary embodiment coupling.

Referring now to FIG. 16, there is shown a schematic representation of one exemplary embodiment coupling 800 with driving circuitry including the use of compensation capacitor(s) 822 in combination with primary 810 and secondary 812. Power source 814 drives supply measurements 818 including voltage 816 and current 820 to parallel compensation capacitor(s) 822 across primary winding 828. Scope measurements of current 824 and voltage 826 across primary winding 828 may be provided. Primary winding 828 is provided in combination with primary core 832 which induces flux into secondary core 834 and current into secondary winding 830. Secondary scope measurements 838 may be provided for voltage 836 and current 840 being provided by secondary winding 830 to load 842. Here, the power coupling may be thought of, and analyzed as such, an electromagnetic power coupling with two or more windings, with a magnetic reluctance, due to the air gap required for motion on the main magnetic flux path, leading to leakage fluxes, and winding self-inductances relative to mutual inductance. To compensate for these self-inductances, capacitors may be added in parallel or series, for example, capacitor(s) 822 electrically, to the primary or/and the secondary windings. The purpose of addition of the capacitors 822 may be to feed the reactive power demand of the self-inductances of the windings, thus lowering the reactive power demand seen by the power source, or on the secondary side. In alternate aspects, more or less capacitor(s) may be provided.

Figure 17:
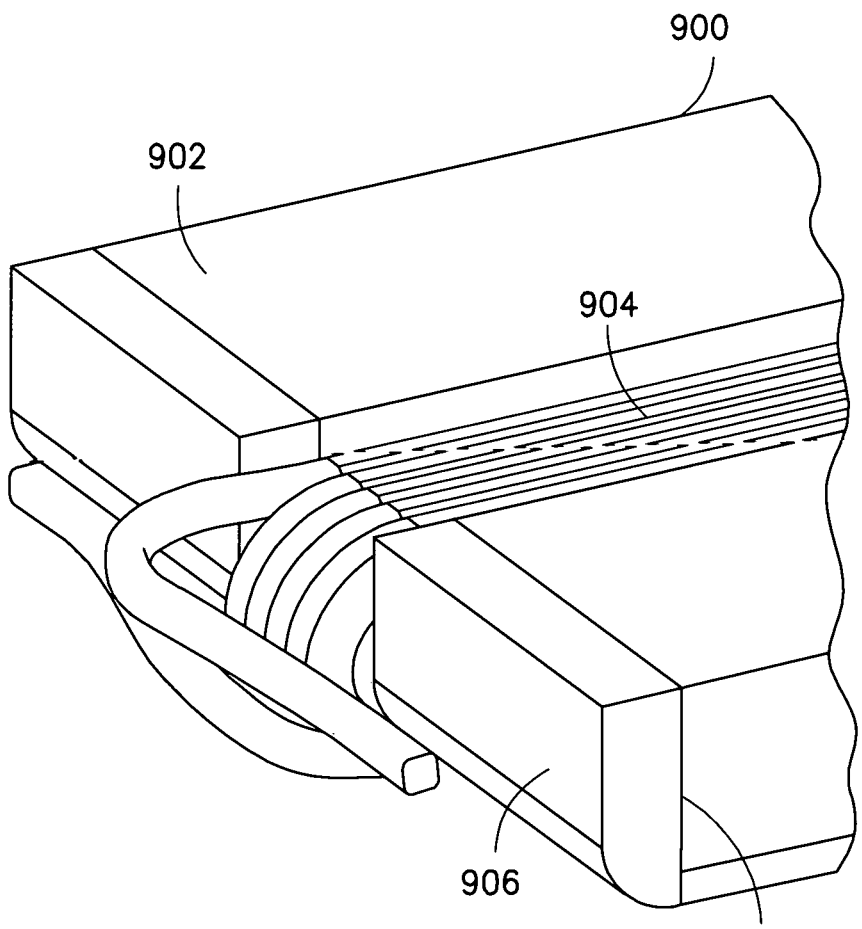
FIG. 17 is a isometric representation of one exemplary embodiment primary or secondary core.
Figure 18:
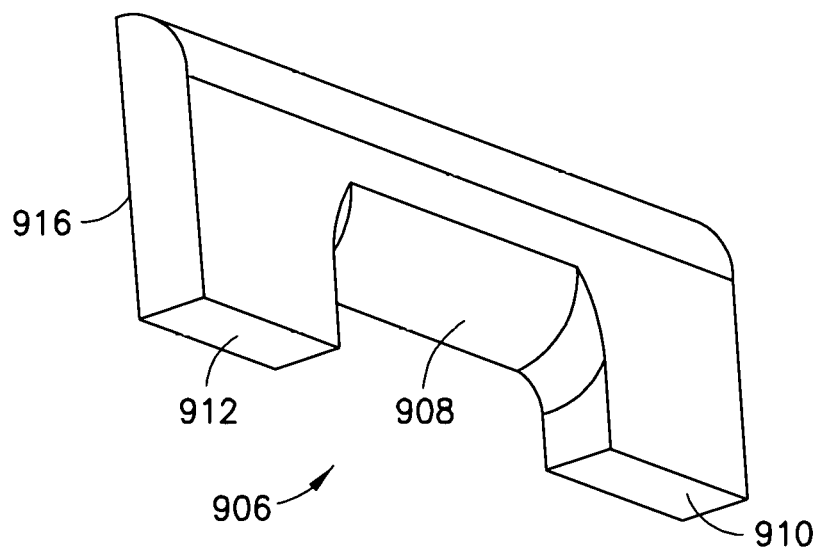
FIG. 18 is a isometric representation of one exemplary embodiment end section.

Referring now to FIG. 17, there is shown a isometric representation of one exemplary embodiment primary or secondary core 900. Referring also to FIG. 18, there is shown an isometric representation of one exemplary embodiment end section 906, for example, an isotropic end section 906. Primary or secondary 900 has laminated core 902, winding 904 and isotropic end section 906 that interfaces with laminated core 902 at flat interface 920 of laminated core 902. Isotropic end section 906 has a similar flat interface 916 corresponding to interface 920 and further having end turn portion 908 and faces 910, 912 that correspond to gap surfaces of laminated core 902. The performance of the power coupling may be improved by introducing a flux concentrating filler 906 inside the void that occurs under the end turns of winding 904. Given the geometry this filler cannot be made of laminations, but rather a soft magnetic composite, or a similar material. By way of example, one possible arrangement for such an end piece is shown in FIG. 18.

In accordance with one exemplary aspect, an apparatus is provided comprising a first induction section comprising a first core and a first coil on the first core. A second induction section comprises a second core and a second coil on the second core. The first core comprises rail extensions, where at least two of the rail extensions extend from opposite ends of the first core and where the second core comprises shoe portions located at respective ones of the rail extensions, where a gap is provided between each of the rail extensions and respective ones of the shoe portions. The second induction section is configured to move relative to the first induction section in a path along the extensions, where the first induction section is configured to induce current in the second induction section, including when the second core moves relative to the first core along the extensions, to provide a contactless induction coupling between the first induction section and the second induction section.

In the apparatus, the extensions may comprise rails which are substantially parallel to one another. In the apparatus, the extensions may comprise substantially straight rails. In the apparatus, the extensions may comprise curved rails. In the apparatus, the extensions may comprise connecting portions which connect the curved rails to a central portion having the first coil thereon. In the apparatus, the curved rails may each form a circle. In the apparatus, the extensions may comprise three or more of the extensions. In the apparatus, at least two second induction sections may be movably located on the first induction section. In the apparatus, the first induction section comprises more than one first coil, where each of the first cores are located on separate middle sections of the first core. In the apparatus, the first induction section comprises more than one first induction section located in series relative to one another. In the apparatus, the second induction section is connected to a robot having a movable arm, where movement of the second induction section relative to the first induction section on the extensions is configured to move the robot along the path. In the apparatus, the first and second induction sections may be connected to different components of a robot which are movable relative to each other, where at least one of the components is a link of a robot arm. In the apparatus, the first core and/or the second core has a central section with a substantial C shape. In the apparatus, the first core and/or the second core has a central section with a substantial E shape. In accordance with another exemplary aspect, a method may comprise providing a first induction section comprising a first core and a first coil on the first core, where the first core comprises rail extensions, where at least two of the rail extensions extend from opposite ends of the first core. The method may further comprise providing a second induction section comprising a second core and a second coil on the second core, where the second core comprises shoe portions; and locating the second induction section relative to the first induction section, where the shoe portions are located at respective ones of the rail extensions, where a gap is provided between each of the rail extensions and respective ones of the shoe portions, and such that the second induction section is configured to move relative to the first induction section in a path along the extensions. The first induction section may be configured to induce current in the second induction section, including when the second core moves relative to the first core along the extensions, to provide a contactless induction coupling between the first induction section and the second induction section.

The exemplary method may further comprise where the extensions comprise substantially straight rails which are substantially parallel to one another. The exemplary method may further comprise where the extensions comprise curved rails. The exemplary method may further comprise where the extensions comprise three or more of the extensions. The exemplary method may further comprise providing the first induction section comprises at least two second induction sections movably located on the first induction section. In accordance with another exemplary aspect, a method may comprise providing a contactless induction coupling comprising a first induction section and a second induction section, where the first induction section comprises a first core and a first coil on the first core, where the first core comprises rail extensions, where at least two of the rail extensions extend from opposite ends of the first core, and where the second induction section comprises a second core and a second coil on the second core, where the second core comprises shoe portions, the second induction section being located relative to the first induction section such that the shoe portions are located at respective ones of the rail extensions with a gap provided between each of the rail extensions and respective ones of the shoe portions, and such that the second induction section is configured to move relative to the first induction section in a path along the extensions; and while the second induction section moves along the extensions of the first induction section, producing alternating magnetic flux at the first induction section and inducing current in the second induction section from the alternating magnetic flux.

A controller, such as comprising at least one processor, at least one memory and computer software having code, may be used to control energizing of the coils and, thus, control movement of the rails/extensions.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
    a first induction section comprising a first core and a first coil on the first core, where the first core comprises first ferromagnetic material; and
    a second induction section comprising a second core and a second coil on the second core, where the second core comprises second ferromagnetic material,
    where the first core comprises transverse laminates and flux concentrating fillers connected to the transverse laminates at opposite ends of the first core, where the first ferromagnetic material at least partially forms rail extensions, where at least two of the rail extensions extend from opposite ends of the first core, where the first core comprises a longitudinal channel along a first longitudinal exterior side of the first core, where the rail extensions are located adjacent opposite sides of the channel, where the first coil is wound on the first core in the channel, around the flux concentrating fillers at the opposite ends of the first core and around a second longitudinal exterior side of the first core, where the second longitudinal exterior side is located on an opposite side of the first core from the first longitudinal exterior side of the first core,
    where the second ferromagnetic material at least partially forms shoe portions located at respective ones of the rail extensions, where a gap is provided between each of the rail extensions and the respective ones of the shoe portions,
    where the second induction section is configured to move relative to the first induction section in a path along the extensions,
    where the first induction section is configured to induce current in the second induction section, including when the second core moves relative to the first core along the extensions, to provide a contactless induction coupling between the first induction section and the second induction section.

2. An apparatus as in claim 1 where the extensions comprise rails which are substantially parallel to one another.

3. An apparatus as in claim 1 where the extensions comprise substantially straight rails.

4. An apparatus as in claim 1 where the extensions comprise curved rails.

5. An apparatus as in claim 4 where the extensions comprise connecting portions which connect the curved rails to a central portion having the first coil thereon.

6. An apparatus as in claim 4 where the curved rails each form a circle.

7. An apparatus as in claim 1 where the apparatus comprises at least two second induction sections movably located on the first induction section.

8. An apparatus as in claim 1 where the first induction section comprises more than one first coil, where each of the first coils are located on separate middle sections of the first core.

9. An apparatus as in claim 1 where the apparatus comprises a plurality of the first induction section, where the plurality of the first induction section are located in series relative to one another.

10. An apparatus as in claim 1 where the second induction section is connected to a robot having a movable arm, where movement of the second induction section relative to the first induction section along the path is configured to occur when the robot also moves along the path.

11. An apparatus as in claim 1 where the first and second induction sections are connected to different components of a robot which are movable relative to each other, where at least one of the components is a link of a robot arm.

12. An apparatus as in claim 1 where the first core and/or the second core has a central section with a substantial C shape.

13. An apparatus as in claim 1 where the first core and/or the second core has a central section with a substantial E shape.

14. An apparatus as in claim 1 where the shoe portions are located vertically above the rail extensions with the gaps located vertically below the shoe portions and vertically above the rail extensions.

15. An apparatus as in claim 1 where the first coil is wrapped around the first core about a first axis, where the second coil is wrapped around the second core about a second axis, where the first and second axes are parallel, and where the first and second coils are in a mirrored orientation relative to each other.

16. A device comprising:
    a robot comprising a robot drive with an articulate arm;
    a shuttle comprising a movable portion and a stationary portion, where the robot is connected to the movable portion; and
    the apparatus as claimed in claim 1, where the first induction section is attached to the stationary portion of the shuttle, where the second induction section is attached to the movable portion of the shuttle, where the first coil at the second longitudinal exterior side of the first core is located in a channel of the stationary portion of the shuttle, where the second coil is located in a channel of the movable portion of the shuttle.

17. A device comprising:
a robot comprising a robot drive with an articulate arm;
a shuttle comprising a movable portion and a stationary portion, where the robot is connected to the movable portion;
the apparatus as claimed in claim 1, where the first induction section is attached to the stationary portion of the shuttle, and where the second induction section is attached to the movable portion of the shuttle; and
a third induction section comprising a third core and a third coil on the third core, where the third core comprises ferromagnetic material, where the third induction section is substantially identical to the first induction section, where the third induction section is attached to the stationary portion of the shuttle, and where the first and third induction sections are aligned with the longitudinal channel and the first coil of the first induction section being aligned with a longitudinal channel and the third coil of the third induction section.

18. A method comprising:
providing a first induction section comprising a first core and a first coil on the first core, where the first core comprises first ferromagnetic material, where the first core comprises transverse laminates and flux concentrating fillers connected to the transverse laminates at opposite ends of the first core, where the first ferromagnetic material at least partially forms rail extensions, where at least two of the rail extensions extend from opposite ends of the first core, where the first core comprises a longitudinal channel along a first longitudinal exterior side of the first core, where the at least two rail extensions are located adjacent opposite sides of the channel, where the first coil is wound on the first core in the channel, around the flux concentrating fillers at the opposite ends of the first core and around a second longitudinal exterior side of the first core, where the second longitudinal exterior side is located on an opposite side of the first core from the first longitudinal exterior side of the first core;
providing a second induction section comprising a second core and a second coil on the second core, where the second core comprises second ferromagnetic material, where the second ferromagnetic material at least partially forms shoe portions; and
locating the second induction section relative to the first induction section, where respective ones of the shoe portions are located at respective ones of the rail extensions, where a gap is provided between each of the rail extensions and respective ones of the shoe portions, and such that the second induction section is configured to move relative to the first induction section in a path along the extensions,
where the first induction section is configured to induce current in the second induction section, including when the second core moves relative to the first core along the extensions, to provide a contactless induction coupling between the first induction section and the second induction section.

19. A method as in claim 18 where the extensions comprise substantially straight rails which are substantially parallel to one another.

20. A method as in claim 18 where the extensions comprise curved rails.

21. A method as in claim 18 where providing the first induction section comprises at least two second induction sections movably located on the first induction section.

22. A method comprising:
providing a contactless induction coupling comprising a first induction section and a second induction section,
where the first induction section comprises a first core and a first coil on the first core, where the first core comprises first ferromagnetic material, where the first core comprises transverse laminates and flux concentrating fillers connected to the transverse laminates at opposite ends of the first core, where the first ferromagnetic material at least partially forms rail extensions, where at least two of the rail extensions extend from opposite ends of the first core, where the first core comprises a longitudinal channel along a first longitudinal exterior side of the first core, where the at least two rail extensions are located adjacent opposite sides of the channel, where the first coil is wound on the first core in the channel, around the flux concentrating fillers at the opposite ends of the first core and around a second longitudinal exterior side of the first core, where the second longitudinal exterior side is located on an opposite side of the first core from the first longitudinal exterior side of the first core,
where the second induction section comprises a second core and a second coil on the second core, where the second core comprises second ferromagnetic material,
where the second ferromagnetic material at least partially forms shoe portions, the second induction section being located relative to the first induction section such that respective ones of the shoe portions are located at respective ones of the rail extensions with a gap provided between each of the rail extensions and the respective ones of the shoe portions, and such that the second induction section is configured to move relative to the first induction section in a path along the extensions; and
while the second induction section moves along the extensions of the first induction section, producing alternating magnetic flux at the first induction section and inducing current in the second induction section from the alternating magnetic flux.

* * * * *